United States Patent [19]
Vannette

[11] Patent Number: 5,927,072
[45] Date of Patent: Jul. 27, 1999

[54] LOAD SENSE HYDRAULIC SYSTEM

[75] Inventor: Avert G. Vannette, Washington, Ill.

[73] Assignee: Caterpillar Inc., Peoria, Ill.

[21] Appl. No.: 09/064,371

[22] Filed: Apr. 22, 1998

Related U.S. Application Data

[60] Provisional application No. 60/044,320, Apr. 24, 1997.

[51] Int. Cl.⁶ .................................................... F16D 31/02
[52] U.S. Cl. ............................................ 60/452; 91/516
[58] Field of Search ........................ 60/426, 452; 91/516

[56] References Cited

U.S. PATENT DOCUMENTS

| | | | |
|---|---|---|---|
| 4,034,563 | 7/1977 | Orth ........................................... | 91/516 |
| 4,537,029 | 8/1985 | Gunda et al. ............................... | 60/452 |
| 4,553,389 | 11/1985 | Tischer et al. ............................. | 60/422 |
| 5,179,835 | 1/1993 | Casey et al. ............................... | 91/516 |
| 5,456,078 | 10/1995 | Goloff ....................................... | 60/327 |
| 5,460,000 | 10/1995 | Kropp ....................................... | 60/452 |

*Primary Examiner*—F. Daniel Lopez
*Attorney, Agent, or Firm*—John W. Grant

[57] ABSTRACT

A load sense hydraulic system includes a pilot operated on/off valve disposed within a signal line which communicates a dynamic load sense signal from a steering control valve to a pressure controller of a load sensing pump. Upon actuating a brake valve or applying a brake mechanism, a pressurized fluid signal downstream of a variable flow control orifice in the brake valve is directed to move the on/off valve to its closed position blocking the dynamic load sense signal from a load sense port to the pump controller. This causes the pump controller to stroke the load sensing pump to its high pressure stand-by position so that the brake valve always functions under high pressure operating conditions.

2 Claims, 1 Drawing Sheet

LOAD SENSE HYDRAULIC SYSTEM

CROSS REFERENCE TO RELATED APPLICATIONS

This application claims the benefit of prior provisional patent application Ser. No. 60/044,320 filed Apr. 24, 1997.

TECHNICAL FIELD

This invention relates generally to a load sense hydraulic system and more particularly to blocking communication of dynamic load sense signal pressure from a priority circuit to a load sense pump controller so that the pump upstrokes to high pressure stand-by when another circuit is operated.

BACKGROUND ART

Many load sense hydraulic systems use a common load sense pump for both the steering circuit and the implement circuits and include a priority valve for ensuring that the steering circuit demands are satisfied before flow is made available to the implement circuits. The priority valve typically controls the pressure and flow to the steering circuit in response to a load sense signal from a steering control valve such as a hand metering unit (HMU). The load sense signal in some steering circuits is referred to as dynamic because oil from the pump flows through a load sense signal line, the priority valve and a tank path in the HMU when the HMU is in its neutral position. Operating the HMU to initiate a steering maneuver causes the pump to upstroke to system pressure by diverting the dynamic oil flow from the tank path to the steering control pressure circuit.

In one hydraulic system, a load sense pressure reducing brake valve is connected to the pump upstream of the HMU to provide oil to a brake circuit. The load sense signal port of the brake valve was connected to the signal line between the HMU and the pump control to upstroke the load sense pump when the brake valve was actuated. However, one of the problems encountered therewith under some operating conditions was that the brake valve could not generate the combination of flow and pressure to control the priority valve resulting in the brake feeling the interaction with the steering and implement functions.

Thus, it would be desirable to integrate the load sense pressure reducing brake valve into the dynamic load sense steering circuit in such a way that brake valve response is improved and interaction with other circuits is reduced or eliminated.

The present invention is directed to overcoming one or more of the problems as set forth above.

DISCLOSURE OF THE INVENTION

In one aspect of the present invention, a load sense hydraulic system includes a variable pressure source of fluid of the type in which the output flow and pressure is varied in response to controlling a dynamic load sense signal output from the source of fluid. A primary control valve is connected to a supply conduit connected to the source of fluid and has a load sense port. A load sense signal line communicates the dynamic load sense signal from the source of fluid to the load sense port. A pilot operated on/off valve is disposed within the signal line and has an open position permitting flow through the load sense line and a closed position blocking flow through the signal line. A secondary control valve connected to the supply conduit downstream of the primary control valve has a load sense output port connected to an end of the on/off valve.

BRIEF DESCRIPTION OF THE DRAWINGS

The sole FIGURE is a schematic representation of a hydraulic system including an embodiment of the present invention.

BEST MODE FOR CARRYING OUT THE INVENTION

Figure 1:
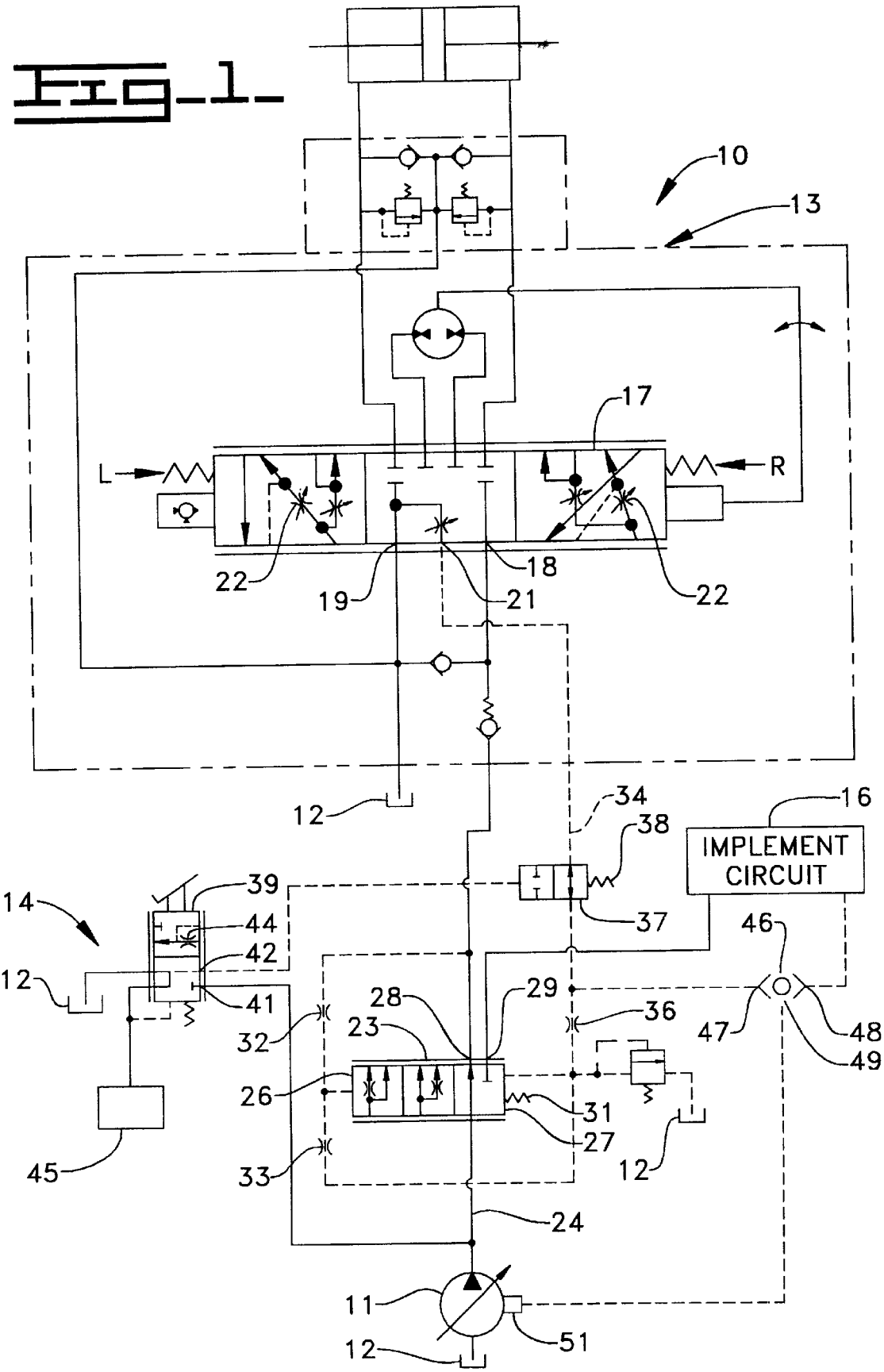

Referring now to the sole drawing, a hydraulic system 10 is shown and adapted for use on a machine (not shown). The hydraulic system 10 includes a source of pressurized fluid 11 of the type in which the output flow and pressure are varied in response to controlling a dynamic load sense signal output from the source of fluid. In this embodiment, the source of fluid includes a load sensing hydraulic pump 11 that receives fluid from a tank 12 and delivers the pressurized fluid to a priority circuit 13, a secondary circuit 14, and an implement circuit 16. The priority circuit 13 is a power steering circuit and includes a flow control steering valve 17 of the type commonly referred to as an HMU. The steering valve has a supply port 18, a tank port 19 and a load sense signal port 21 that communicates with the tank port 19 at the neutral position shown. Shifting the steering valve 17 from the neutral position to either the left turn position L or the right position R defines a main variable flow control orifice 22. The steering valve, in a manner well known in the art, blocks the signal port 21 from the tank port 19 and communicates a load pressure signal taken from downstream of the variable flow control orifice 22 with the signal port 21 at the operating positions.

A priority valve 23 is connected to the pump 11 through a supply conduit 24. The priority valve 23 has opposite ends 26, 27, a priority flow port 28 connected to the supply port 18, an excess flow port 29 connected to the implement circuit 16 and a spring 31 biasing the priority valve to a priority flow position as shown for communicating the pump 11 with the priority flow port 28. The end 26 is connected to the priority flow port 28 through a flow dampening orifice 32 and to the end 27 through a flow control orifice 33. The end 27 is also connected to the signal port 21 through a dynamic load sense signal line 34 having a dampening orifice 36 disposed therein. The priority valve is operative in the usual manner to satisfy the demands of the steering circuit before excess fluid is passed to the excess flow port 29.

A pilot operated on/off valve 37 is disposed within the signal line 34 and has an open position permitting fluid flow through the signal line 34 and an off position blocking fluid flow through the signal line 34. The on/off valve 37 is biased to the on position by a spring 38.

The secondary circuit 14 in this embodiment is a hydraulic brake system which includes a load sense pressure reducing brake valve 39 having an inlet port 41 connected to the supply conduit 24 upstream of the priority valve 23 and a load signal control port 42 connected to an end of the on/off valve 37. With the brake valve 39 in the brake off position shown, the signal control port 42 communicates with the tank 12. Downward movement of the brake valve 39 defines a variable flow control orifice 44 for infinitely communicating the inlet port 41 with a brake mechanism 45. The brake valve 39, in a manner well known in the art, blocks the signal control port 42 from the valve 12 and communicates a load pressure signal taken from downstream of the variable flow control orifice 44 to the signal control port 42 when the brake valve is moved downwardly to an operative position.

A resolver 46 has an inlet 47 connected to the signal line 34 upstream of the on/off valve 37, another inlet 48 connected to the implement circuit 16, and an outlet 49 connected to a pressure responsive flow and pressure controller 51 of the hydraulic pump 11.

Industrial Applicability

In use when the brake valve 39 is in it's brake-off position shown, the steering circuit 13 and the implement circuit 16 operate in the conventional manner. For an understanding of the present invention, it is sufficient only to note that the load sense signal in the signal line 34 is dynamic in that a small amount of oil output from the hydraulic pump 11 passes through the priority valve 23, the orifices 32, 33 and 36 and flows through the signal line 34, the open on/off valve 37 and the load signal port 21 of the steering valve 17 to the tank 12 when the steering valve 17 is in the neutral position shown. Under this condition, the pressure of the load sense signal in the signal line 34 is not sufficient to cause the controller 51 to upstroke the pump 11.

Applying the brake mechanism 45 is initiated by depressing the brake valve 39 to establish flow through the flow control orifice 44 of the brake valve 39 to the brake mechanism 45 in the usual manner. In this embodiment however, the load signal control port 42 directs pressurized fluid from downstream of the orifice 44 to the end of the on/off valve 37 as pilot pressure for moving the on/off valve to its off position blocking the dynamic fluid flow through the signal line 34. This raises the pressure level of the load sense signal in the signal line 34 upstream of the on/off valve 37 to a level sufficient to cause the controller 51 to upstroke the pump 11 to its high pressure stand-by setting. The pressure reducing aspects of the brake valve 39 now become effective to reduce the pressure of the oil directed to the brake mechanism 45 commensurate with the operating position of the brake valve.

In view of the foregoing, it is readily apparent that the addition of the on/off valve in the signal line causes the pump to upstroke to its high stand-by position when the brake valve is actuated. Thus, since the brake valve functions in essentially a high pressure system, the brake valve response is greatly improved and interaction with other circuits of the hydraulic system is reduced or eliminated.

Other aspects, objects and advantages of this invention can be obtained from the study of the drawings, the disclosure and the appended claims.

I claim:

1. A load sense hydraulic system, which includes a variable pressure source of fluid having a pressure controller, wherein the pressure controller controls output flow and pressure from the source of fluid;

a supply conduit connected to the source of fluid;

a priority circuit connected to the supply conduit and having a priority load sense port;

a load sense signal line communicating a priority dynamic load sense signal from the priority load sense port to the pressure controller; a pilot operated on/off valve disposed within the signal line and having an on position permitting flow through the signal line and an off position blocking flow through the signal line;

a pilot line connected to an end of the on/off valve; and a secondary circuit connected to the supply conduit upstream of the primary circuit and having a load signal control port connected to the pilot line, operative to control the position of the on/off valve.

2. The load sense hydraulic system of claim 1 wherein the priority circuit includes a steering control valve and the secondary circuit includes a brake valve.

* * * * *